(12) United States Patent
Nishimura et al.

(10) Patent No.: US 9,169,888 B2
(45) Date of Patent: Oct. 27, 2015

(54) TUBE PROVIDED WITH BRANCH TUBE, SHOCK ABSORBER, AND METHOD FOR MAKING THEM

(71) Applicant: HITACHI AUTOMOTIVE SYSTEMS, LTD., Ibaraki (JP)

(72) Inventors: Makoto Nishimura, Tokyo (JP); Takayuki Ohno, Kanagawa (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 7 days.

(21) Appl. No.: 13/965,482

(22) Filed: Aug. 13, 2013

(65) Prior Publication Data

US 2014/0048364 A1 Feb. 20, 2014

(30) Foreign Application Priority Data

Aug. 20, 2012 (JP) ................... 2012/181933
Feb. 28, 2013 (JP) ................... 2013/039558

(51) Int. Cl.
*F16F 9/32* (2006.01)

(52) U.S. Cl.
CPC ............... *F16F 9/3235* (2013.01); *F16F 9/325* (2013.01); *Y10T 29/49615* (2015.01)

(58) Field of Classification Search
CPC ........ F16F 9/325; F16F 9/3235; B21C 37/15; B21C 37/151; B21C 37/155; B21C 37/156; B21C 37/157; B21C 37/29; B21C 37/30
USPC ......... 188/266.2, 266.6, 315, 322.2; 29/896.93, 897.2; 72/367.1, 370.23, 72/370.27
See application file for complete search history.

(56) References Cited

U.S. PATENT DOCUMENTS

| | | | | |
|---|---|---|---|---|
| 5,301,412 A * | 4/1994 | Hahn et al. | ...................... | 29/434 |
| 5,353,898 A * | 10/1994 | Handke et al. | ............. | 188/322.2 |
| 5,413,196 A * | 5/1995 | Forster | ........................ | 188/266.6 |
| 5,449,055 A * | 9/1995 | Geiling et al. | ............. | 188/266.6 |
| 5,467,851 A * | 11/1995 | Handke et al. | ................ | 188/313 |
| 5,651,433 A * | 7/1997 | Wirth et al. | ................ | 188/266.6 |
| 5,685,400 A * | 11/1997 | Handke et al. | ............. | 188/266.6 |
| 5,740,890 A * | 4/1998 | Forster | ........................ | 188/322.2 |
| 5,960,915 A * | 10/1999 | Nezu et al. | ................ | 188/266.6 |
| 5,988,331 A * | 11/1999 | Schiffler | ................ | 188/322.19 |
| 6,283,259 B1 * | 9/2001 | Nakadate | ................... | 188/322.2 |
| 8,469,162 B2 * | 6/2013 | Nishimura et al. | ........ | 188/266.2 |

(Continued)

FOREIGN PATENT DOCUMENTS

JP 11-159563 6/1999

*Primary Examiner* — Thomas Irvin
(74) *Attorney, Agent, or Firm* — Wenderoth, Lind & Ponack, L.L.P.

(57) ABSTRACT

A shock absorber includes a cylinder sealingly containing oil, and a piston coupled with a piston rod and inserted in the cylinder. The shock absorber generates a damping force by controlling an oil flow generated according to a movement of the piston with use of a damping force generation mechanism. A separator tube is externally disposed around the cylinder. The oil is transmitted into the damping force generation mechanism via a branch tube integrally formed on a cylindrical sidewall of the separator tube. The branch tube is formed on the cylindrical sidewall of the separator tube by burring processing. Both sides of a proximal portion of the branch tube in a circumferential direction of the cylindrical sidewall of the separator tube are pressed from an interior to concave an inner circumferential surface radially outwardly, thereby forming recesses.

20 Claims, 13 Drawing Sheets

(56) References Cited

U.S. PATENT DOCUMENTS

| | | | |
|---|---|---|---|
| 8,899,391 B2 * | 12/2014 | Yamasaki et al. | 188/322.2 |
| 2012/0073918 A1 * | 3/2012 | Nishimura et al. | 188/266.2 |
| 2014/0090938 A1 * | 4/2014 | Nishimura | 188/269 |
| 2015/0041265 A1 * | 2/2015 | Yamashita | 188/315 |

* cited by examiner

TUBE PROVIDED WITH BRANCH TUBE, SHOCK ABSORBER, AND METHOD FOR MAKING THEM

BACKGROUND OF THE INVENTION

The present invention relates to a shock absorber capable of generating a damping force by controlling a flow of hydraulic fluid in a cylinder during a stroke of a piston rod, a tube provided with a branch tube capable of being used for the shock absorber, and a method for making them.

For example, Japanese Patent Application Public Disclosure No. H11-159563 discusses a tubular shock absorber mounted on a suspension apparatus of a vehicle such as an automobile. This shock absorber has a triple tube structure including a cylinder, an outer tube disposed around the cylinder, and a cylindrical member (a separator tube) disposed between the cylinder and the outer tube. An annular passage is defined between the cylinder and the cylindrical member. Further, the cylindrical member is configured as a tube provided with a branch tube by including an integrally formed branch tube, which cylindrically protrudes from a side wall of the cylindrical member radially outwardly while being in communication with the annular passage.

The shock absorber disclosed in the above-described Japanese Patent Application Public Disclosure No. H11-159563 uses the branch tube integrally formed at the side wall of the cylindrical member as a passage of hydraulic fluid. According to this configuration, the cylindrical member and the branch tube have to have a sufficient pressure resistance against the hydraulic fluid, which is supposed to be highly pressurized. Further, the cylindrical member also has to have a sufficient fatigue strength because the cylindrical member is supposed to repeatedly receive a load due to a pressure change according to a stroke change of the piston rod between an extension side and a compression side. Then, while satisfying these strength-related requirements, the wall thickness is desired to be thinned to reduce the weight of the shock absorber.

SUMMARY OF THE INVENTION

An object of the present invention is to enhance a pressure resistance and a fatigue strength of a tube provided with a branch tube that can being used for a shock absorber, while realizing a reduction in the thickness of the tube.

To achieve the above-described and other objects, an aspect of the present invention is a method for making a tube provided with a branch tube, which includes a tube having a cylindrical sidewall and a substantially cylindrical branch tube integrally formed on the sidewall of the tube and protruding radially outwardly. The method includes hole formation of forming a prepared hole on the cylindrical sidewall of the tube, burring processing of causing a portion of the cylindrical sidewall of the tube that surrounds the prepared hole to protrude radially outwardly to form the branch tube, and a residual stress change of pressing a vicinity of a proximal portion of the branch tube to change a residual stress generated at the proximal portion of the branch tube by the burring in a compression direction.

Further, another aspect of the present invention is a tube provided with a branch tube including a tube having a cylindrical sidewall and a substantially cylindrical branch tube integrally formed on the sidewall of the tube and protruding radially outwardly, a shock absorber using the tube provided with the branch tube, and a method for manufacturing them. The method includes hole formation of forming a prepared hole on the cylindrical sidewall of the tube, burring processing of causing a portion of the cylindrical sidewall of the tube that surrounds the prepared hole to protrude radially outwardly to form the branch tube, and a residual stress change of pressing a vicinity of a proximal portion of the branch tube to change a residual stress generated at the proximal portion of the branch tube by the burring in a compression direction.

DETAILED DESCRIPTION OF THE INVENTION

Figure 1:
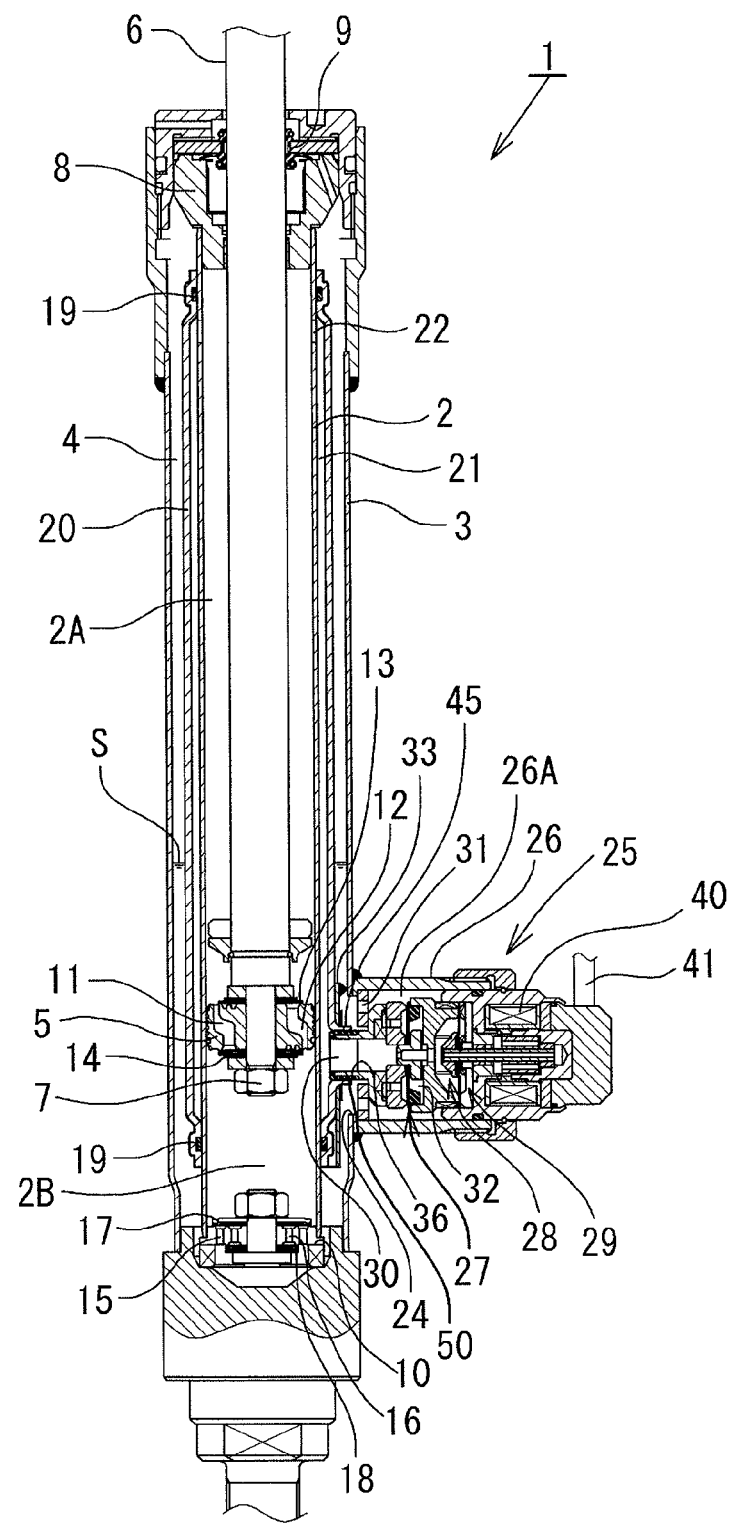
FIG. 1 is a vertical cross-sectional view of a shock absorber according to an embodiment of the present invention.

Exemplary embodiments of the present invention that will be described below can achieve not only the object described in the above SUMMARY OF THE INVENTION but also other various objects, and provide various effects. The embodiments that will be described below can mainly achieve the following objects, which include the object discussed in SUMMARY OF THE INVENTION.

[Increase in Damping Force]

In recent years, shock absorbers have been demanded to exert a further powerful damping force. This is because, when a vehicle body has a movement leading to an inclined orientation to one side such as rolling and pitching, an increase in the damping force of the shock absorber can control the movement of the vehicle body, thereby realizing stable running. However, the increase in the damping force raises a problem of an increase in the inner pressure in the cylinder to increase a difference between the pressure in the reservoir and the pressure in the cylinder, thereby causing concentration of a stress on the joint portion between the cylindrical member and the branch tube to weaken the pressure resistance.

[Improvement of Characteristic]

As discussed in the above-described Japanese Patent Application Public Disclosure No. H11-159563, oil and gas are sealingly contained in the reservoir. This leads to such a problem that a jet flow of the oil introduced from a damping force generation mechanism into the reservoir causes occurrence of a swirl and bubbles around the fluid surface of the oil in the reservoir, and therefore occurrence of aeration. Because the occurrence of aeration prevents acquisition of a stable damping force, this problem is required to be solved to improve the damping force characteristic. A possible solution therefor is to provide a baffle plate around an inflow port from which the oil is introduced from the damping force generation mechanism into the reservoir to prevent generation of a jet flow. The baffle plate is desired to be fixed by another method than welding to improve assemblability and prevent occurrence of contamination. In consideration thereof, one conceivable method therefor is to hold the baffle plate with use of the branch tube, but this requires a further increase in the axial length of the branch tube.

[Reduction in Weight]

It is required to reduce weights of parts mounted on an automobile by even a slight amount for the purpose of, for example, improving the fuel efficiency. Especially, the shock absorber having the above-described triple tube structure including the cylinder, the separator tube as the cylindrical member, and the outer tube disposed around them is heavier in weight compared to a single tube type shock absorber and a double tube type shock absorber, and therefore a large reduction in weight is demanded accordingly. However, if the outer tube is used as a strut, a reduction in the wall thickness is limited because the outer tube should support a lateral force applied on a piston rod. On the other hand, the separator tube does not directly receive the lateral force, so the wall thickness thereof can reduce to some degree but should secure a sufficient pressure resistance against the high-pressure hydraulic fluid. Further, the separator tube should also secure a sufficient fatigue strength because the separator tube is supposed to repeatedly receive a load due to a pressure change according to a stoke change of the piston rod between the extension side and the compression side. Further, if the branch tube is formed at a thin member, the thickness of the branch tube portion is further thinned, making it difficult to secure the pressure resistance and the fatigue strength. Forming the branch tube having a sufficient pressure resistance and a sufficient fatigue strength, and reducing the wall thickness of the separator tube are conflicting desires, and solving the relationship therebetween is a large object for the separator tube.

In the following description, embodiments of the present invention will be described with reference to the accompanying drawings.

As illustrated in FIG. 1, a shock absorber according to an embodiment of the present invention is a tubular hydraulic shock absorber capable of adjusting a damping force, and has a double tube structure including a cylinder 2 and an outer tube 3 externally disposed around the cylinder 2. An annular reservoir 4 is defined between the cylinder 2 and the outer tube 3. A piston 5 is slidably fitted in the cylinder 2, and the interior of the cylinder 2 is divided into two chambers, a cylinder upper chamber 2A and a cylinder lower chamber 2B by this piston 5. One end of a piston rod 6 is coupled to the piston 5 by a nut 7. The other end of the piston rod 6 extends through the cylinder upper chamber 2A, is inserted through a rod guide 8 and an oil seal 9 attached at upper ends of the cylinder 2 and the outer tube 3, and protrudes toward the outside of the cylinder 2. A base valve 10, which divides the cylinder lower chamber 2B and the reservoir 4, is disposed at a lower end of the cylinder 2.

Passages 11 and 12 are formed through the piston 5 to establish communication between the cylinder upper and lower chambers 2A and 2B. Then, a check valve 13 is disposed at the passage 12 so as to allow only a flow of hydraulic fluid from the cylinder lower chamber 2B to the cylinder upper chamber 2A. Further, a disk valve 14 is disposed at the passage 11 so as to be opened when the hydraulic pressure in the cylinder upper chamber 2A reaches a predetermined pressure, thereby releasing this pressure to the cylinder lower chamber 2B.

Passages 15 and 16 are formed through the base valve 15 so as to establish communication between the cylinder lower chamber 2B and the reservoir 4. A check valve 17 is disposed at the passage 15 so as to allow only a flow of the hydraulic fluid from the reservoir 4 to the cylinder lower chamber 2B. Further, a disk valve 18 is disposed at the passage 16 so as to be opened when the hydraulic pressure in the cylinder lower chamber 2B reaches a predetermined pressure, thereby releasing this pressure to the reservoir 4. Oil is sealingly contained in the cylinder 2 as the hydraulic fluid, while oil and gas are sealingly contained in the reservoir 4.

A separator tube 20, which corresponds to a tube provided with a branch tube, is externally fitted at the upper and lower ends of the cylinder 2 via seal members 19. An annular passage 21 is defined between a sidewall of the cylinder 2 and a cylindrical sidewall of the separator tube 20 externally disposed around the cylinder 2. The annular passage 21 is in communication with the cylinder upper chamber 2A via a passage 22 formed through the sidewall of the cylinder 2 around the upper end. A small-diameter substantially cylindrical branch tube 45 protrudes at a lower portion of the sidewall of the separator tube 20. This branch tube 45 includes a connection port 23, which is a passage in communication with the annular passage 21. Further, a large-diameter inflow port 24 is formed through a sidewall of the outer tube 3 concentrically with the branch tube 45 in an opened state. A damping force generation mechanism 25 is mounted at the inflow port 24 at the sidewall of the outer tube 3.

The damping force generation mechanism 25 includes a cylindrical case 26 attached to the inflow port 24 of the outer tube 3. A pilot type (backpressure type) main valve 27, and a pilot valve 28 are contained in the cylindrical case 26. The pilot valve 28 is a pressure control valve configured to be driven by a solenoid so as to control a valve-opening pressure of the main valve 27. Further, a fail valve 29 is disposed at a downstream side of the pilot valve 28. The fail valve 29 operates when a failure occurs. Further, a coupling tube 30 is liquid-tightly inserted in a connection port 23 of the branch tube 45. The coupling tube 30 defines an inlet passage. The oil is introduced from the connection port 23 into the coupling tube 30, and is transmitted to a chamber 26A surrounded by the case 26 through the main valve 27, the pilot valve 28, and the fail valve 29. The oil in the chamber 26A is transmitted into the reservoir 4 through a passage 31 at the end of the case 26, and the inlet port 24 of the outer tube 3.

Before the main valve 27 is opened, the damping force generation mechanism 25 generates a damping force by controlling an oil flow by the pilot valve 28. After the main valve 27 is opened, the damping force generation mechanism 25 mainly generates a damping force by the main valve 27. Further, a part of the oil at an upstream side of the pilot valve 28 is introduced into a backpressure chamber 32 behind the main valve 27, and the inner pressure thereof is applied to the main valve 27 in a valve-opening direction. A pressure for controlling the pilot valve 28 is adjusted by an electric current applied to a solenoid 40 via a lead wire 41, whereby the damping force can be adjusted. As a result, the inner pressure in the backpressure chamber changes, whereby the valve-opening pressure and valve-opening degree of the main valve 27 can be adjusted. Further, the fail valve 29 is closed when the vehicle stops at a traffic light, or when a failure occurs in power supply to the solenoid valve 40 to restrict a flow of the oil instead of the pilot valve 28 set in a constantly-opened state, thereby preventing an excessive reduction in the damping force to maintain an appropriate damping force.

Figure 2:
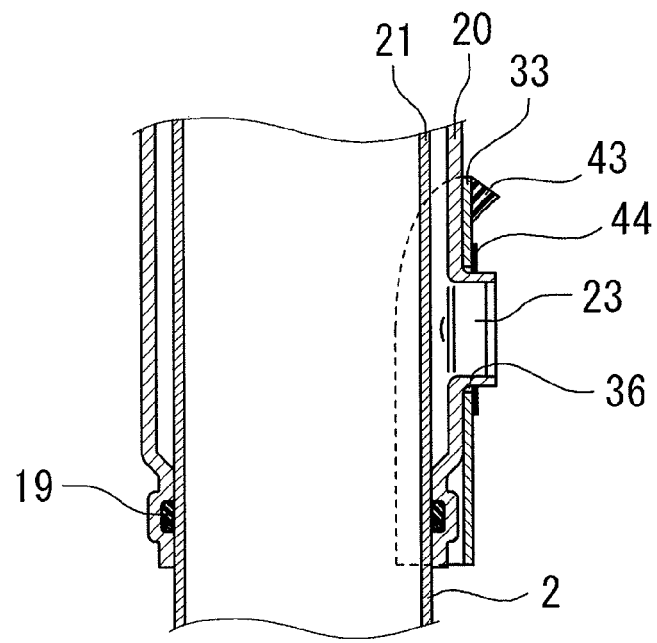
FIG. 2 is a vertical cross-sectional view illustrating a branch tube portion of a separator tube with a baffle plate of the shock absorber illustrated in FIG. 1 attached thereto in an enlarged manner.
Figure 3:
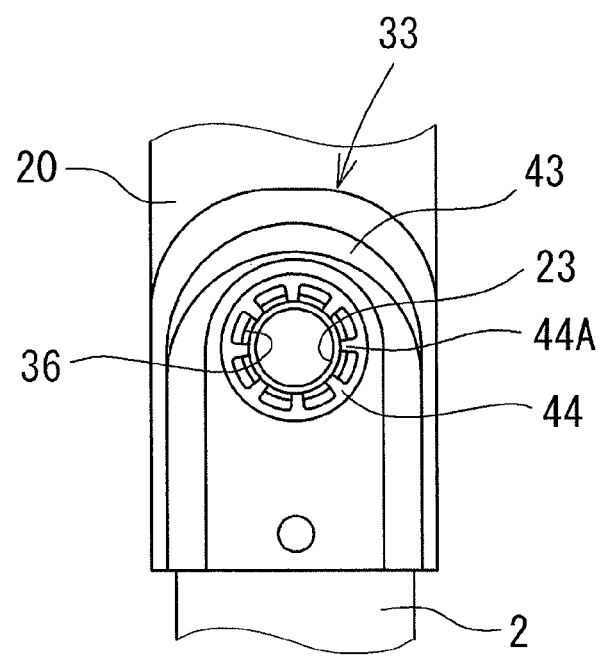
FIG. 3 is a front view of the branch tube portion of the separator tube with the baffle plate illustrated in FIG. 2 attached thereto.

A baffle plate 33 as a partitioning member is disposed in the reservoir 4. The baffle plate 33 is mounted on a position of an outer circumferential surface of the separator tube 20 that faces the inflow port 24 of the outer tube 3. As illustrated in FIGS. 2 and 3, the baffle plate 33 is disposed while being curved along the outer circumferential surface of the separator tube 20. The baffle plate 33 is a plate-like member having a semicircular upper portion and a rectangular lower portion downwardly extending from the circumference of the semicircle as viewed in FIG. 3 (the same applies to the following description).

The baffle plate 33 has an opening 36 as a held portion in which the branch tube 45 of the separator tube 20 is inserted. The baffle plate 33 is fixed and attached to the separator tube 20 by a toothed washer 44 fitted around the branch tube 45 of the separator tube 20, which is inserted in the opening 36.

The toothed washer 44 includes a plurality of radially extending claws 44A integrally formed at an inner circumferential portion of an annular spring member. The branch tube 45 can be press fitted in the toothed washer 44 due to deflection of the radially extending claws 44A. Then, once the branch tube 45 is press fitted, the branch tube 45 cannot be easily pulled out therefrom due to a wedge effect. A rubber partitioning member 43, which is an elastic seal member disposed so as to define a substantially U shape, is fixedly attached at the baffle plate 33 along the upper portion and the circumferential edge of the side of the baffle plate 33 by baking. The partitioning member 43 has a substantially triangle shape in cross section. The bottom side of the triangle is fixedly attached to the main body of the baffle plate 33, and the apex of the triangle is pressed against the inner circumferential surface of the outer tube 3, thereby enhancing the seal performance between the baffle plate 33 and the outer tube 3 while preventing generation of noises.

Next, the shape of a portion of the separator tube 20 where the branch tube 45 is formed will be described in detail with reference to FIGS. 4 to 6.

Figure 4:
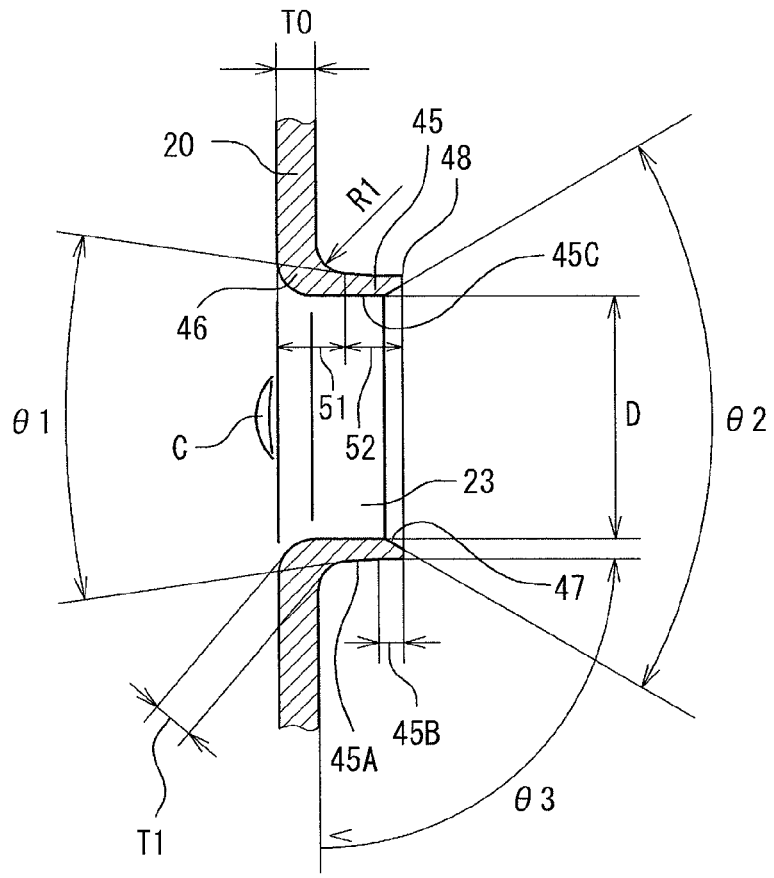
FIG. 4 is a vertical cross-sectional view illustrating the branch tube portion of the separator tube illustrated in FIG. 2 in an enlarged manner.

As illustrated in FIG. 4, the substantially cylindrical branch tube 45 is integrally formed at the cylindrical sidewall of the separator tube 20. The wall surrounding the circular opening as the connection port 23 in communication with the annular passage 21 is bent so as to protrude radially outwardly, by which the branch tube 45 is formed. An outer circumferential portion of the branch tube 45 is tapered, thereby defining a tapered surface 45A with its outer diameter reducing. A tapered angle $\theta 1$ of the tapered surface 45A is approximately 16 degrees. Strictly speaking, if the branch tube 45 is formed by plastic deformation such as drawing processing, the outer circumferential portion of this tapered surface 45A in axial cross section is slightly concavely curved.

An outer circumferential portion of a joint portion 46 between the tapered surface 45A of the branch tube 45 and the sidewall of the separator tube 20 is smoothly curved so as to define a rounded curve of a radius R1.

Preferably, the radius R1 of the rounded curve of the outer circumferential portion of the joint portion 46 is approximately 1.5 mm when the diameter of the separator tube 20 is approximately 40 to 45 mm, and an inner diameter D of the connection port 23 is approximately 12 mm. Further, the inner circumferential portion of the joint portion 46 is also smoothly curved so as to have roundness. A wall thickness T1 thereof is substantially equal to a wall thickness T0 of the sidewall of the separator tube 20.

In the present disclosure, an axial range of the branch tube 45 corresponding to the curves of the inner and outer circumferential portions is defined as a curved portion 51. On the other hand, an axial range of the branch tube 45 from the curved portion 51 to a distal end of the branch tube 45 is defined as a cylindrical portion 52.

The outer circumferential portion of the distal end of the branch tube 45 is not tapered, i.e., forms a cylindrical portion 45B having constant inner and outer diameters along the axial direction. Therefore, at the cylindrical portion 52, the ratio of the reduction in the outer diameter is smaller at the cylindrical portion 45B at the distal end side than the ratio of the reduction in the outer diameter at the proximal end side having the tapered surface 45A as the outer circumferential portion (this ratio is 0 at the cylindrical portion 45B). The cylindrical portion 45B may be slightly tapered at a ratio of the reduction in the outer diameter that is smaller than the tapered surface 45A at the proximal end side.

The inner circumferential surface of the branch tube 45, which defines the connection port 23, is not tapered. In other words, the inner circumferential surface of the branch tube 45 forms a cylindrical surface 45C having a constant inner diameter along the axial direction. This cylindrical surface is approximately 3.5 to 4 mm in axial length. A chamfered portion 47, which is chamfered in a tapered manner at a tapered angle θ2, is formed at the inner circumferential edge of the distal end of the branch tube 45. A distal surface 48 of the branch tube 45 is a flat surface.

Further, an angle θ3, which is defined by the sidewall of the separator tube 20 and a tangential line connecting the cylindrical portion 45B and the sidewall of the separator tube 20, is set to 90 degrees to improve the assemblability when the branch tube 45 is inserted in the opening 36 of the baffle plate 33, and prevent the branch tube 45 from being pulled out from the opening 36 of the baffle plate 33.

Figure 5:
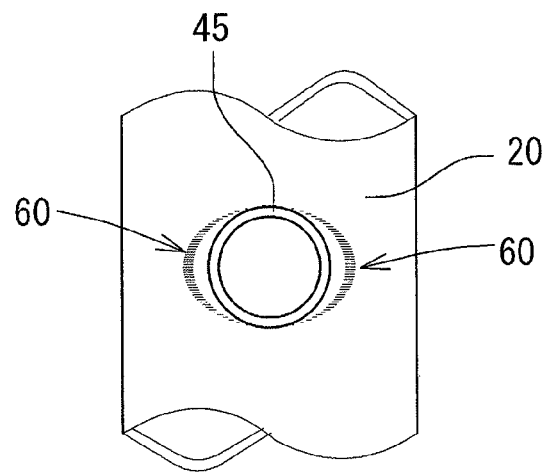
FIG. 5 is a front view illustrating the branch tube portion of the separator tube illustrated in FIG. 2 in an enlarged manner.
Figure 6:
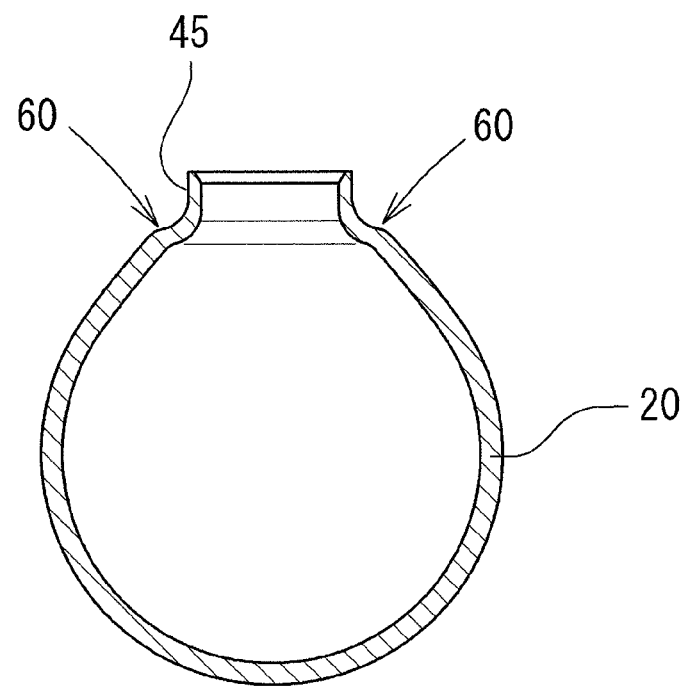
FIG. 6 is a transverse cross-sectional view of the branch tube portion of the separator tube illustrated in FIG. 2.
Figure 7:
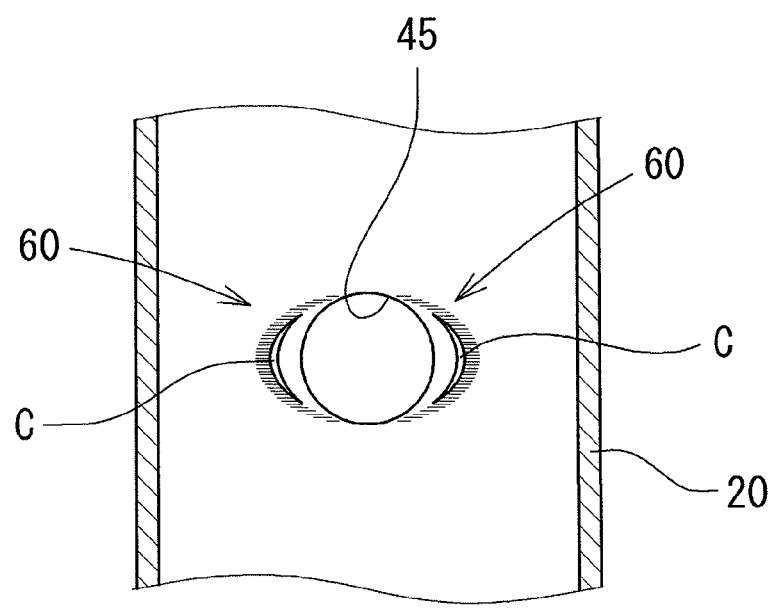
FIG. 7 is a vertical cross-sectional view of the branch tube portion of the separator tube illustrated in FIG. 2 as viewed from the inside thereof.

Further, as illustrated in FIGS. 5 to 7, protrusions 60, which protrude radially outwardly, are formed at the both sides of the proximal portion (the coupling portion 46) of the branch tube 45 in the circumferential direction of the cylindrical sidewall where the branch tube 45 of the separator tube 20 protrudes.

In FIG. 7, which illustrates the separator tube 2 as viewed from the inside thereof, the inner wall portions of the separator tube 20 corresponding to the protrusions 60 are illustrated as recesses.

As illustrated in FIG. 5, the protrusions 60 have large curvature radii at the proximal portion of the branch tube 45 so that the widths thereof approximately match the diameter of the branch tube 45. Then, the contours of the protrusions 60 have such curved shapes that the curvature radii thereof is reducing toward the opposite sides from the branch tube 45.

Figure 15:
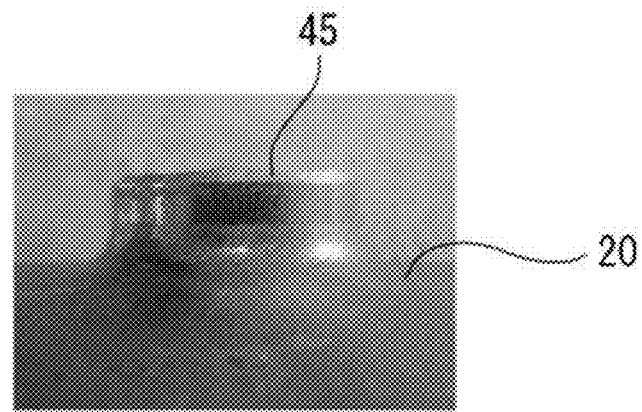
FIG. 15 is a photograph of a side of the branch tube portion after the burring processing and press processing of the separator tube illustrated in FIG. 2.

The protrusions 60 are formed as described above, whereby the boundary between the proximal portion of the branch tube 45 and the sidewall (the protrusions 60) of the separator tube 20 has a substantially-constant substantially-linear shape along the whole circumference of the branch tube 45 in a side view (refer to FIG. 15). If the protrusions 60 are not provided, the boundary between the proximal portion of the branch tube 45 and the sidewall of the separator tube 20 has a curved shape in a side view (refer to FIG. 19).

Figure 16:
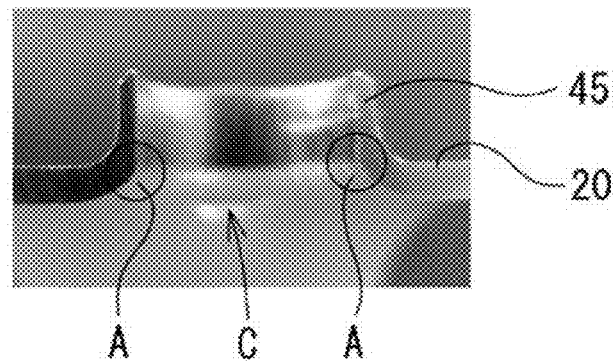
FIG. 16 is a photograph of a vertical cutaway view of the branch tube portion after the burring processing and the press processing of the separator tube illustrated in FIG. 2.

The branch tube 45 is formed by performing burring processing on the cylindrical sidewall of the separator tube 20. Forming the branch tube 45 by the burring processing results in generation of a residual tensile stress at the both sides (refer to portions A in FIG. 16) of the proximal portion of the branch tube 45 in the axial direction of the inner surface of the cylindrical sidewall of the separator tube 20.

The protrusions 60 are formed by pressing the both sides (refer to FIG. 5) of the proximal portion of the branch tube 45 in the circumferential direction of the cylindrical sidewall of the separator tube 20 from the inside of the separator tube 20 to cause them to protrude radially outwardly. As a result, a compression stress is generated due to a plastic flow, whereby the residual tensile stress generated by the burring processing is reduced or eliminated, or is converted into a residual compression stress.

It is desirable that the present embodiment is configured in such a manner that the protrusions 60 protrude from the sidewall, but the present embodiment can be realized by just generating a compression stress by a plastic flow to reduce the residual tensile stress generated by the burring processing or convert it into a residual compression stress, instead of forming noticeable protrusions. Further, the present embodiment can be realized even by concaving the inner circumferential surface of the separator tube 20 to form a recess on the inner circumferential surface without the protrusions 60 generated.

Next, a procedure for integrally forming the branch tube 45 and the protrusions 60 on the cylindrical surface of the separator tube 20 will be described.

Figure 8:
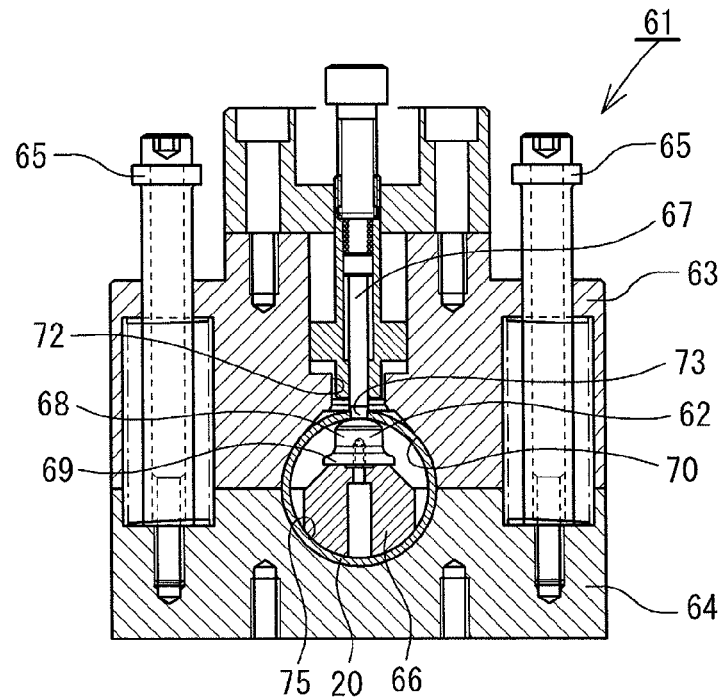
FIG. 8 is a vertical cross-sectional view illustrating a burring die unit for forming the branch tube portion of the separator tube illustrated in FIG. 2 with the separator tube set therein.
Figure 9:
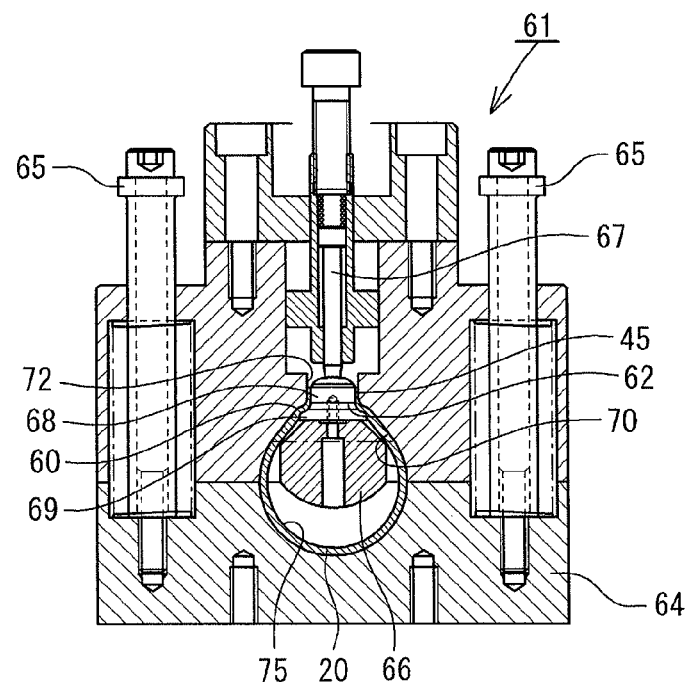
FIG. 9 is a vertical cross-sectional view illustrating the burring die unit illustrated in FIG. 8 with the branch tube of the separator tube being processed by burring processing.
Figure 10:
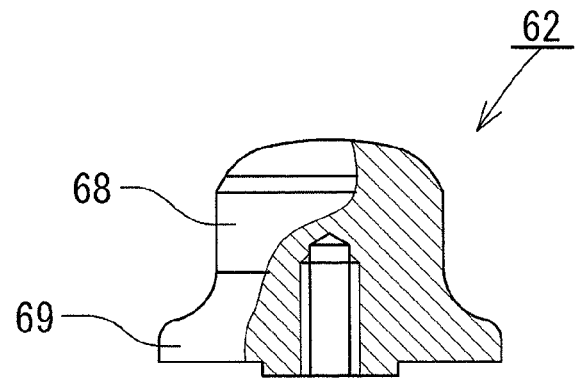
FIG. 10 is a partially cutaway side view of a burring punch for forming the branch tube of the separator tube illustrated in FIG. 2.
Figure 11:
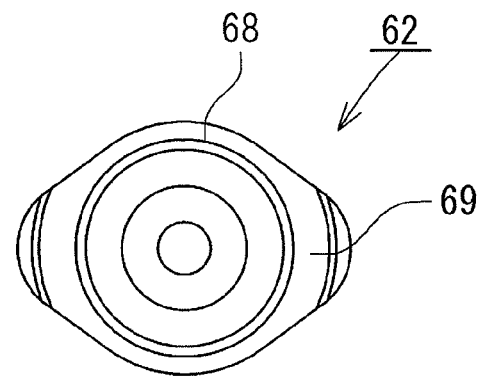
FIG. 11 is a front view of the burring punch illustrated in FIG. 10.
Figure 12:
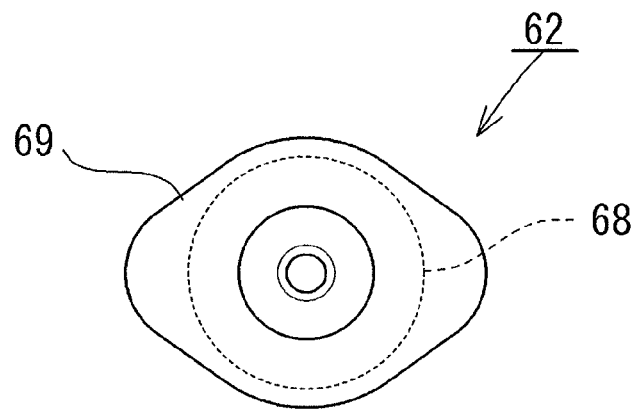
FIG. 12 is a back view of the burring punch illustrated in FIG. 10.
Figure 13:
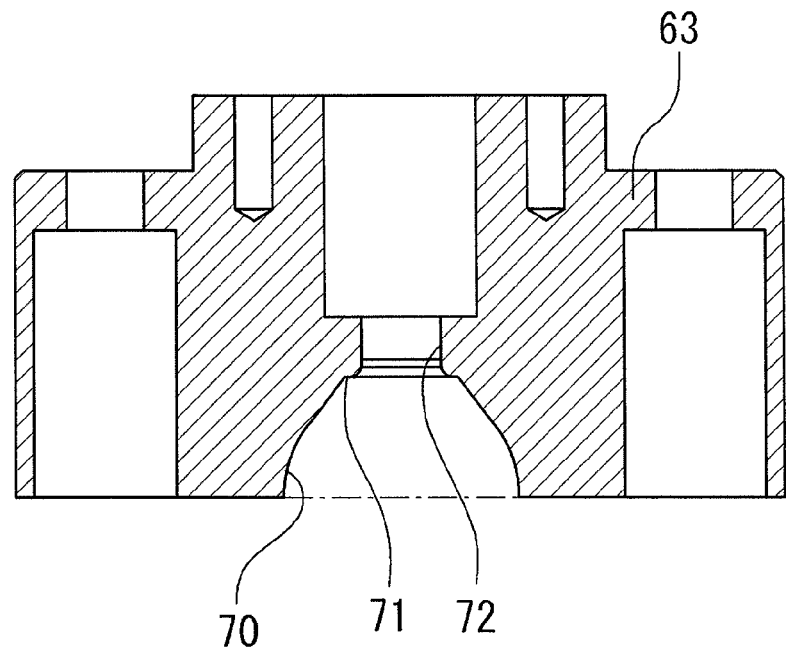
FIG. 13 is a vertical cross-sectional view of a burring die for forming the branch tube of the separator tube illustrated in FIG. 2.
Figure 14:
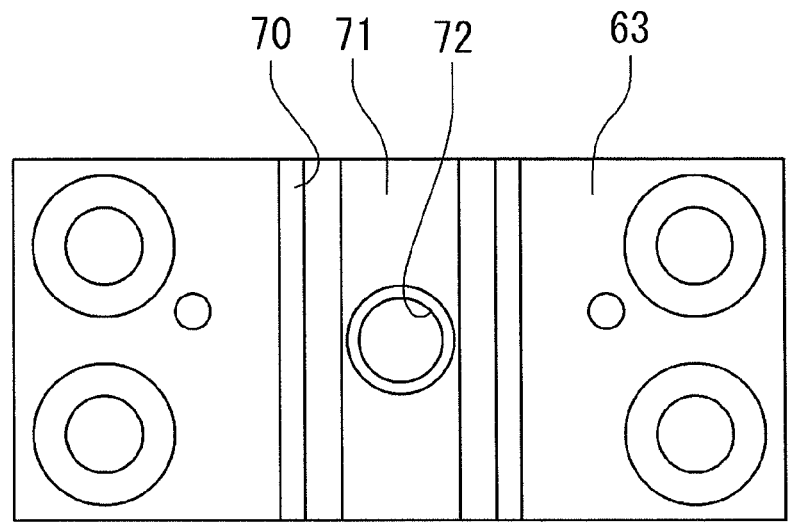
FIG. 14 is a bottom view of the burring die illustrated in FIG. 13.

The branch tube 45 and the protrusions 60 can be formed by performing the burring processing on the separator tube 20 with use of a burring die unit 61 illustrated in FIGS. 8 and 9, a burring punch 62 illustrated in FIGS. 10 to 12, and a burring die 63 illustrated in FIGS. 13 and 14.

The burring die unit 61 includes the burring die 63, a lower die 64, guide posts 65, a burring punch 62, a mandrel 66, and a positioning pin 67. The burring die 63 is an upper die of the burring die unit 61. The guide posts guide the burring die 63 and the lower die 64 so as to be able to be opened and closed. The burring punch 62 is mounted on the mandrel 66, and the mandrel 66 drives the burring punch 62. The positioning pin 67 fixes the separator tube 20 set in the burring die 63 (the upper die) and the lower die 64 in place.

As illustrated in FIGS. 10 to 12, the burring punch 62 includes a substantially cylindrical branch tube formation portion 68, and an emboss formation portion 69. A distal end of the branch tube formation portion 68 is rounded. The emboss formation portion 69 is integrally formed at a proximal end the branch tube formation portion 68, and has a large diameter in the diametrical direction. In this manner, the burring punch 62 has a substantially convexed shape in a side view (refer to FIG. 10).

The emboss formation portion 69 has a substantially rhomboid shape with curves thereof rounded, and the shorter diagonal thereof is slightly longer than the diameter of the branch tube formation portion 68 in a planar view (refer to FIG. 11). Further, the emboss formation portion 69 has a diameter gradually reducing from a proximal end side thereof toward the branch tube formation portion 68, thereby being smoothly connected to the proximal portion of the branch tube formation portion 68.

As illustrated in FIGS. 13 and 14, the burring die 63 includes a concaved portion 70 substantially semicircular in cross section for receiving the cylindrical sidewall of the separator tube 20. The substantially semicircular concaved portion 70 has a flatly formed top extending toward the outer circumferential side. The top of the concaved portion 70 has a flat portion 71 that will face the emboss formation portion 69 of the burring punch 62 to form the protrusions 60 as will be described below. A die hole 72 is formed at the center of the flat portion 71. The branch tube formation portion 68 of the burring punch 62 will be inserted in the die hole 72.

The lower die 64 includes a concaved portion 75 semicircular in cross section for receiving the cylindrical sidewall of the separator tube 20. Then, the cylindrical sidewall of the separator tube 20 is held by the concaved portion 70 of the burring die 63 (the upper die) and the concaved portion 75 of the lower die 64.

The mandrel 66 is disposed in a space substantially circular in cross section, which is defined by the concaved portions 70 and 75 of the burring die 63 and the lower die 64, and drives the burring punch 62 by a predetermined processing force to insert the burring punch 62 into the die hole 72.

Next, a procedure for forming the branch tube 45 on the separator tube 20 with use of the burring die unit 61 will be described.

An oval prepared hole 73 is formed on the cylindrical sidewall of the separator tube 20 by, for example, cutting or punching (hole formation). The prepared hole 73 is appropriately dimensioned so as to have a longer diameter in the axial direction of the separator tube 20 and a shorter diameter in the circumferential direction of the separator tube 20.

Subsequently, as illustrated in FIG. 8, the separator tube 20 is set in the concaved portion 70 of the burring die 63, and is fixed by closing the burring die 63, which is the upper die, and the lower die 64. At this time, the tip of the positioning pin 67, which is placed so as to protrude in the concaved portion 70 via the die hole 72, is inserted and fitted in the prepared hole 73. The separator tube 20 is positionally fixed in this manner. The burring punch 62 mounted on the mandrel 66 is set so as to face the prepared hole 73 and the die hole 72 in the fixed separator tube 20.

As illustrated in FIG. 9, the mandrel 66 is moved so that the tip of the burring punch 62 presses a part of the cylindrical sidewall of the separator tube 20 from the inside, and the tip of the burring punch 62 is pushed in the die hole 72 while forcibly expanding the prepared hole 73, thereby forming the branch tube 45 between the die hole 72 and the branch tube formation portion 68 of the burring punch 62 (burring processing). At this time, the tapered surface 45A, the cylindrical portion 45B, and the cylindrical surface 45C are formed so as to have desired shapes by appropriately setting the shapes of the burring punch 62 and the die hole 72, and the timing of the pressurizing.

The curved portion 51, which is curved, is formed at the inner and outer circumferences of the joint portion 46 so as to have a thickness T1 substantially equal to a thickness T0 of the separator tube 20 in such a manner that the joint portion 46, which is supposed to most significantly receive a stress generated by the hydraulic pressure in the cylinder 2, has a sufficient thickness, in order to form the branch tube 45 while effectively utilizing the thickness of the separator tube 20. The cylindrical surface 45C and the tapered surface 45A are respectively formed at the inner circumferential side and the outer circumferential side continuously from the joint portion 46. The portion of the branch tube 45 corresponding to the tapered surface 45A has a thinner thickness than the joint portion 46.

Then, the thickness of the branch tube 45 is further reducing toward the distal end side. In other words, the outer diameter of the branch tube 45 is reducing from the joint portion 46 at the proximal end side toward the distal end side, while the inner diameter of the branch tube 45 is constant from the proximal end side toward the distal end side.

Then, when the coupling tube 30, which defines the inlet passage of the damping force generation mechanism 25, is inserted in the connection port 23, a seal member 50, which is an annular seal disposed around the outer circumference of the coupling tube 30, is set in contact with the inner circumference of the cylindrical portion 52.

In this manner, a seal effect is exerted between the seal member 50 and the inner circumference of the cylindrical portion 52, whereby a pressure gradient is generated between the seal member 50 and the inner circumference of the cylindrical portion 52 from the cylinder 2 toward the distal end side.

As a result, a high hydraulic pressure is prevented from being applied on the distal end side of the branch tube 45 beyond where the cylindrical portion 52 is sealed, reducing a stress generated by the hydraulic pressure. Therefore, the branch tube 45 can be formed with the thickness of the cylindrical portion 52 reduced. In sum, the joint portion 46 should have a thick thickness enough to endure a stress generated by the hydraulic pressure, while the distal side of the cylindrical portion 52 beyond the seal member 50 can have a reduced thickness just capable of holding the coupling tube 30.

When the branch tube 45 is formed by pushing the cylindrical sidewall of the separator tube 20 in the die hole 72, a residual tensile stress is generated at the both sides (the portions A in FIG. 16) of the proximal portion of the branch tube 45 in the axial direction of the inner surface of the cylindrical sidewall of the separator tube 20.

Then, during the burring processing, i.e., while the branch tube formation portion 68 of the burring punch 62 is pushing the cylindrical sidewall of the separator tube 20 into the die hole 72, the emboss formation portion 69 of the burring punch 62 abuts against the both sides of the proximal portion of the branch tube 45 in the circumferential direction of the inner surface of the cylindrical sidewall of the separator tube 20.

Then, the curved sidewall of the separator tube 20 is pressed from the inside to protrude toward the flat portion 71 of the burring die 63, by which these protrusions are formed as the protrusions 60 (pressing and a residual stress change).

Figure 17:
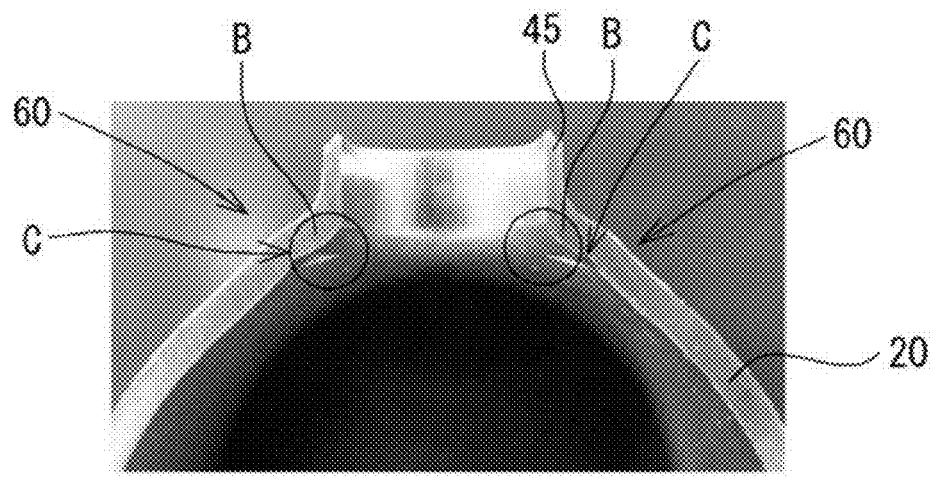
FIG. 17 is a photograph of a transverse cutaway view of the branch tube portion after the burring processing and the press processing of the separator tube illustrated in FIG. 2.
Figure 18:
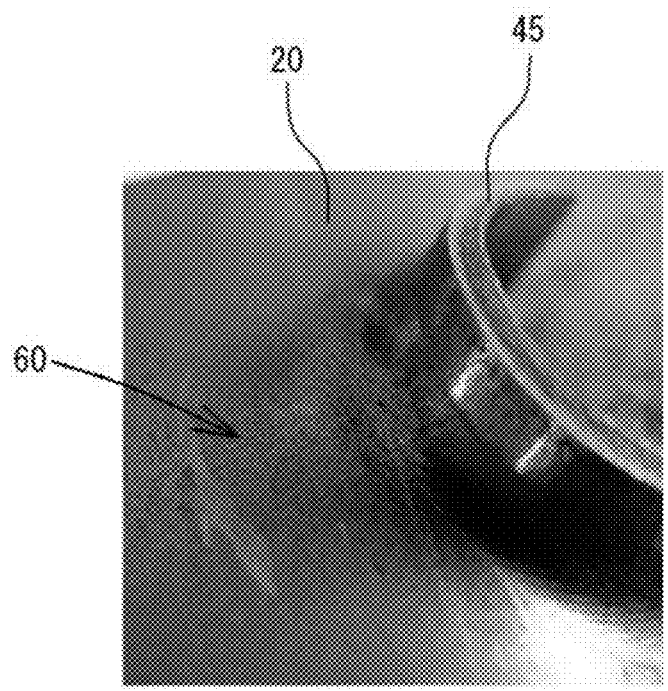
FIG. 18 is a photograph of a perspective view of the branch tube portion after the burring processing and the press processing of the separator tube illustrated in FIG. 2.

As a result, a plastic flow of the material is generated from the both sides (portions B illustrated in FIG. 17) of the proximal portion of the branch tube 45 in the circumferential direction of the inner surface of the cylindrical sidewall of the separator tube 20 toward the both sides (the portions A illustrated in FIG. 16) of the branch tube 45 in the axial direction. This results in a reduction or elimination of the residual tensile stress generated at the above-described portions A during the burring processing of the branch tube 45, or conversion of this residual tensile stress into a residual compression stress. In the drawings, labels C indicate impressions generated by pressing of the emboss formation portion 69 of the burring punch 62.

Figure 19:
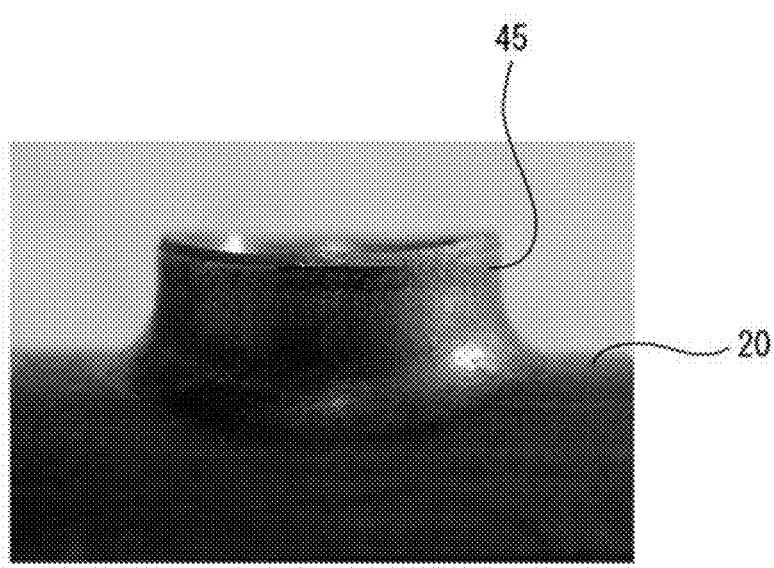
FIG. 19 is a photograph of a side of the branch tube portion of the separator tube processed only by the burring processing but unprocessed by the press processing.

In this manner, the protrusions 60 are formed at the both sides of the proximal portion of the branch tube 45 in the circumferential direction of the cylindrical sidewall of the separator tube 20. Due to this formation, the proximal portion of the branch tube 45, i.e., the boundary between the branch tube 45 and the sidewall of the separator tube 20 shows a substantially linear shape in a side view as illustrated in FIG. 15. On the other hand, as illustrated in FIG. 19, if the protrusions are not formed, the boundary between the proximal portion of the branch tube 45 and the sidewall of the separator tube 20 shows a curved shape in a side view. This indicates that the formation of the protrusions 60 generates a plastic flow due to the compression to reduce the circumferential length of the proximal portion of the branch tube 45. As a result, the residual tensile stress generated at the above-described portions A by the burring processing of the branch tube 45 can be reduced or converted into a residual compression stress.

At this time, the reduction or the elimination of the residual tensile stress or the conversion of the residual tensile stress into a residual compression stress due to the plastic flow according to the formation of the protrusions 60 more heavily depends on the processing force of the emboss formation portion 69 of the burring punch 62 and the burring die 63 than the processed amounts of the protrusions 60, i.e., how long the protrusions 60 protrude. In the present embodiment, the separator tube 20 is a drawn tube of structural steel tube STKM12B (tensile strength TS=approximately 400 MPa, elongation EL=approximately 50%, completely annealed), and has a wall thickness of approximately 1.8 to 2.0 mm and an outer diameter of 40.6 to 45 mm. In these conditions, a desirable processing force is approximately 25 kN. The outer tube 3 is a structural steel tube STKM13A, and has a wall thickness of 3.0 mm. The cylinder 2 is a structure steel tube STKM12B, and has a wall thickness of 1.6 mm.

Next, the operation and effects of the thus-configured present embodiment will be described.

The shock absorber 1 is mounted between relatively movable members, for example, between a sprung side (a vehicle body side) and an unsprung side (a wheel side) of a suspension apparatus of a vehicle, with the piston rod 6 up and the base valve 10 down. The lead wire 41 of the shock absorber 1 is connected to a controller.

During an extension stroke of the piston rod 6, a movement of the piston 5 in the cylinder 2 causes the check valve 13 of the piston 5 to be closed. Before the disk valve 14 is opened, the hydraulic fluid in the cylinder upper chamber 2A is pressurized to be transmitted through the passage 22 and the annular passage 21, thereby being introduced from the connection port 23 of the separator tube 20 into the inlet passage 30 of the damping force generation mechanism 25. Then, the hydraulic fluid introduced from the inlet passage 30 is delivered through the main valve 27, the pilot valve 28, and the fail valve 29, is guided into the chamber 26A surrounded by the case 26, and is further supplied into the reservoir 4 via the passage 31 at the end of the case 26 and the inflow port 24 of the outer tube 3.

At this time, the hydraulic fluid of an amount corresponding to the displacement of the piston 5 is introduced from the reservoir 4 into the cylinder lower chamber 2B by opening the check valve 17 of the base valve 10. When the pressure in the cylinder upper chamber 2A reaches the valve-opening pressure of the disk valve 14 of the piston 5, the disk valve 14 is opened to release the pressure in the cylinder upper chamber 2A to the cylinder lower chamber 2B, thereby preventing an excessive increase in the pressure in the cylinder upper chamber 2A.

During a compression stroke of the piston rod 6, a movement of the piston 5 in the cylinder 2 causes the check valve 13 of the piston 5 to be opened while the check valve 17 of the passage 15 of the base valve 10 to be closed. Before the disk valve 18 is opened, the hydraulic fluid in the piston lower chamber 2B is introduced into the cylinder upper chamber 2A. The hydraulic fluid of an amount corresponding to the entry of the piston rod 6 into the cylinder 2 is supplied from the cylinder upper chamber 2A into the reservoir 4 via the same route as the route at the time of the above-described extension stroke. When the pressure in the cylinder lower chamber 2B reaches the valve-opening pressure of the disk valve 18 of the base valve 10, the disk valve 18 is opened to release the pressure in the cylinder lower chamber 2B into the reservoir 4, thereby preventing an excessive increase in the pressure in the cylinder lower chamber 2B.

As a result, during both the extension stroke and the compression stroke of the piston rod 6, the damping force generation mechanism 25 generates a damping force by the pilot valve 28 before the main valve 27 is opened (in a low piston speed region), and generates a damping force according to the opening degree of the main valve 27 after the main valve 27 is opened (in a high piston speed region). Then, the damping force can be adjusted by adjusting the control pressure of the pilot valve 28 according to an electric current applied to the solenoid 40, resulting in a change in the inner pressure in the backpressure chamber 32 to adjust the valve-opening pressure and the opening degree of the main valve 27. Further, when the vehicle stops at a traffic light, or when a failure occurs in power supply to the solenoid 40, the fail valve 29 is closed to restrict the oil flow instead of the pilot valve set into a constantly-opened state, thereby preventing an excessive reduction in the damping force to maintain an appropriate damping force.

Due to the provision of the baffle plate 33, the partitioning member 43 of the baffle plate 33 separates the portion where the oil flows from the damping force generation mechanism 25 into the reservoir 4 via the communication passage 31 and the inflow port 24 of the outer tube 3, from a fluid surface S of the oil in the reservoir 4.

This configuration limits the oil flow at the upper side in the reservoir 4 in use, among the oil flowing from the damping force generation mechanism 25 into the reservoir 4 via the passage 31 and the inflow port 24 of the outer tube 3.

Therefore, it is possible to prevent generation of a swirl and bubbles around the fluid surface S, which otherwise might be generated due to a jet flow of the oil flowing into the reservoir 4 via the inflow port 24, to prevent the gas from being melted into the oil in the reservoir 4 to make generation of aeration and cavitation difficult, thereby obtaining a stable damping force.

Further, the baffle plate 33 can ease a sudden increase in the area of the flow passage of the oil flowing from the damping force generation mechanism 25 into the reservoir 4, and therefore can ease a sudden increase in the flow speed of the oil when flowing into the reservoir 4 to prevent generation of a swirl. As a result, it is possible to prevent babbles from being generated and the gas from being melted into the oil, which otherwise might be caused by swirl generation, to make generation of aeration and cavitation difficult, thereby obtaining a stable damping force.

The tapered surface 45A is formed at the outer circumferential portion of the branch tube 45, which defines the connection port 23 of the separator tube 20. Further, the outer circumferential portion and the inner circumferential portion of the joint portion 46 between the branch tube 45 and the sidewall of the separator tube 20 are smoothly curved so that the wall thickness T1 of the joint portion 46 is substantially equal to the wall thickness T0 of the sidewall of the separator tube 20. These features enhance the strength of the joint portion 46, and also reduce the stress generated at the joint portion 46 due to the difference between the pressures in the annular passage 21 and the reservoir 4. As a result, it is possible to increase the pressure resistance against the hydraulic fluid, and therefor reduce the thickness of the separator tube 20 to reduce the weight of the shock absorber 1.

The inner circumferential surface of the branch tube 45, which defines the connection port 23, is the cylindrical surface 45C that is not tapered. Therefore, when the coupling tube 30, which defines the inlet passage of the damping force generation mechanism 25, is inserted in the connection port 23, it is possible to prevent the oil from leaking by ensuring the necessarily seal performance.

Due to the formation of the chamfered portion 47 at the inner circumferential edge of the distal end of the branch tube 45, the coupling tube 30 can be easily inserted at the time of assembling.

Due to the formation of the not-tapered cylindrical portion 45B at the outer circumferential portion of the distal end of the branch tube 45, the claws 44A of the toothed washer 44 are engaged with the cylindrical portion 45B to enable acquisition of a sufficient holding force when the baffle plate 33 is attached to the branch tube 45 by the toothed washer 44.

According to the present embodiment, the tapered surface 45A having a reducing diameter toward the distal end is formed at the outer circumferential portion of the branch tube 45, whereby it is possible to prevent the wall thickness T1 from reducing at the joint portion 46 between the branch tube 45 and the sidewall of the separator tube 20 at the time of drawing processing, and realize the wall thickness T1 substantially equal to the wall thickness T0 of the sidewall of the separator tube 20. At this time, the wall thickness reduces at the distal end of the branch tube 45, but the coupling tube 30 of the damping force generation mechanism 25 is inserted in the connection port 23 at this portion, and the seal member 50 seals this inserted portion. Therefore, the applied pressure reduces from the cylinder-side contact point of the seal member 50 toward the contact point at the distal end side of the branch tube 45 with a pressure gradient generated. No high pressure is applied to the distal end side of the branch tube 45 out of contact with the seal member 50, whereby it is possible to obtain the separator tube 20 capable of enduring a high pressure without increasing the weight.

According to the present embodiment, the tapered surface 45A at the outer side of the cylindrical portion 52 is constituted by a single tapered surface. However, if the branch tube 45 has an elongated axial length, the tapered surface 45A may be constituted by a plurality of tapered surface so as to reduce the ratio of the reduction in the outer diameter at the distal end side in consideration of the pressure gradient of the seal. Further, this plurality of tapered surface may be smoothly connected to form a curved surface. Further, if the shock absorber 1 is configured so as to allow a reduction in the axial length of the branch tube 45, the cylindrical portion 45B may be omitted at the distal end.

Figure 20:
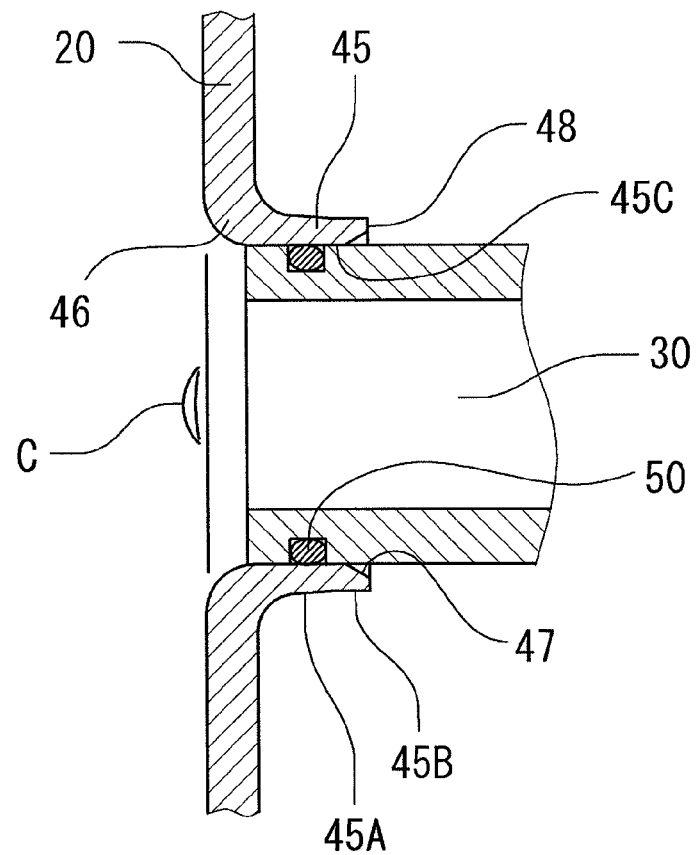
FIG. 20 is a vertical cross-sectional view of the branch tube portion, illustrating a modification of a coupling tube inserted in the branch tube in the shock absorber illustrated in FIG. 1.

According to the present embodiment, the seal member 50 is configured to cover the whole outer circumference of the coupling tube 30. However, for example, as illustrated in FIG. 20, the seal member 50 may be disposed in an outer circumferential groove formed at the coupling tube 30. Even with this configuration, the thickness is still thicker at the proximal end side beyond the seal member 50 where a high pressure is supposed to be applied, whereby it is possible to secure the pressure resistance.

When the shock absorber 1 operates, the pressure of the high-pressure oil is applied to the inside of the separator tube 20, leading to generation of a large tensile stress. Therefore, if a residual tensile stress exists at the proximal portion of the branch tube 45 on the inner surface of the separator tube 20, the proximal portion of the branch tube 45 is easily broken by a fatigue fracture when the high oil pressure is repeatedly applied to the separator tube 20 according to the operation of the shock absorber 1. For solving this problem, according to the present embodiment, the protrusions 60 are formed at the separator tube 20. Therefore, it is possible to reduce or eliminate the residual tensile stress at the proximal portion of the branch tube 45 or convert the residual tensile stress to a residual compression stress to enhance the pressure resistance and the fatigue stress of the separator tube 20. As a result, it is possible to further reduce the thickness of the separator tube 20. The reduction in the thickness of the separator tube 20 facilitates the machining of the separator tube 20 including formation of the above-described branch tube 45, improving the productivity. Further, this manufacturing can be realized by a simpler processing facility than increasing the fatigue strength by a surface treatment such as nitridation, and therefore is effective in cutting the manufacturing cost.

To demonstrate the effectiveness of the present embodiment, the branch tube 45 and the protrusions 60 were formed at the separator tube 20 under the above-described conditions. The resultant shock absorber 1 could produce a test result showing a durability of ten million times or more despite a requirement of a durability of 2 million times in a fatigue test in which the shock absorber 1 was subject to repeated application of a high pressure of 2 to 10 MPa×5 Hz. A shock absorber, which was not provided with the protrusions 60 but were formed under the otherwise same conditions, had a fatigue fracture after a load was repeatedly applied approximately 2 million times.

There has been conventionally known a technique according to which, when a branch tube is integrally formed at a cylindrical sidewall of a separator tube, a flat portion is formed at the sidewall of the separator tube, a circular prepared hole is formed at the flat portion in a piercing manner, and then the burring processing is performed (U.S. Pat. No. 5,353,898).

According to this technique, the prepared hole can have a circular shape to realize even application of a force in the circumferential direction at the time of processing, thereby improving the workability. However, in this case, a high load will be applied to the flat portion by a high oil pressure. Further, this promotes concentration of a stress on a joint portion between the branch tube and the flat portion, leading to a problem of a reduction in the pressure resistance. Further, the burring processing causes generation of a residual tensile stress along the whole circumference of the inner surface of the proximal portion of the branch tube, whereby the problem of fatigue fracture remains unsolved, leaving the object of the present invention unachieved.

Next, another embodiment of the present invention will be described with reference to FIGS. 21 to 27.

The shock absorber according to the present embodiment is identically configured to the above-described embodiment illustrated in FIGS. 1 to 20 except for a difference in the proximal portion of the branch tube 45 of the separator tube 20. Therefore, in the following description, similar components and portions to the above-described embodiment will be identified by the same reference numerals, and only different components and portions will be described in detail.

Figure 21:
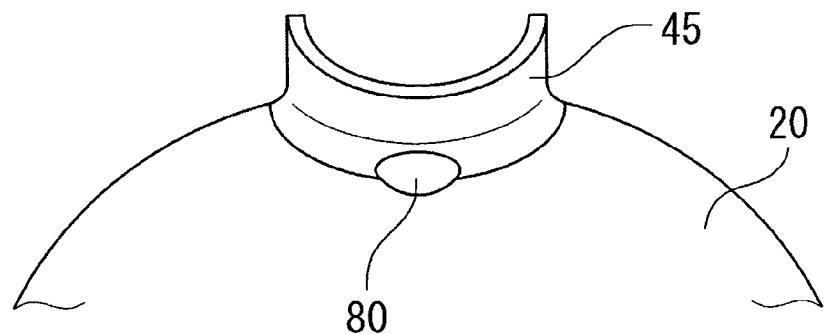
FIG. 21 is a cutaway perspective view illustrating a branch tube portion of a separator tube according to another embodiment of the present invention.
Figure 22:
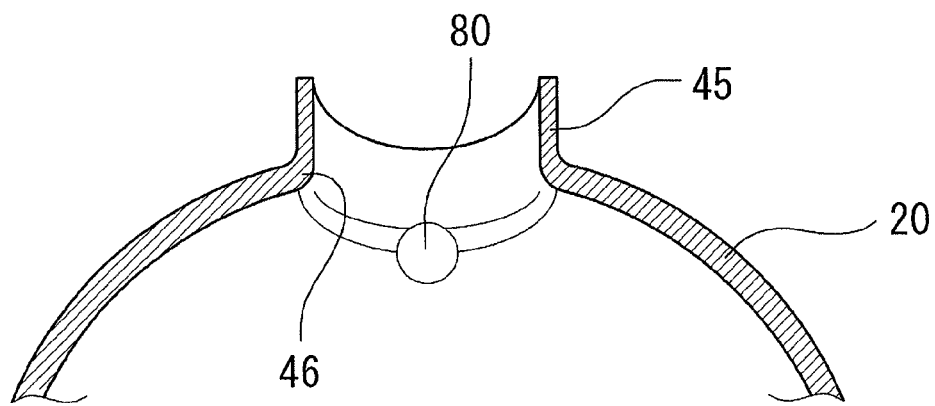
FIG. 22 is a cutaway perspective view of the branch tube portion of the separator tube illustrated in FIG. 21 as viewed from the inside.

FIGS. 21 and 22 illustrate the branch tube 45 of the separator tube 20 of the shock absorber 1 according to the present embodiment in a view cutaway along a plane extending perpendicularly to the axis of the separator tube 20 and passing through the center of the branch tube 45. In particular, FIG. 21 is a perspective view of the branch tube 45 from the outside, and FIG. 22 is a perspective view from the inside.

As illustrated in FIGS. 21 and 22, in the separator tube 20 of the shock absorber according to the present embodiment, the protrusions 60 are not formed at the both sides of the proximal portion (the joint portion 46) of the branch tube 45. Therefore, the boundary between the proximal portion of the branch tube 45 and the cylindrical sidewall of the separator tube 20 is curved in a similar manner to the boundary illustrated in FIG. 19. The branch tube 45 is formed by performing the burring processing on the cylindrical sidewall of the separator tube 20, and a press processing portion 80 is formed by performing press processing on the inner side of the proximal portion of the branch tube 45 after the burring processing.

Figure 27:
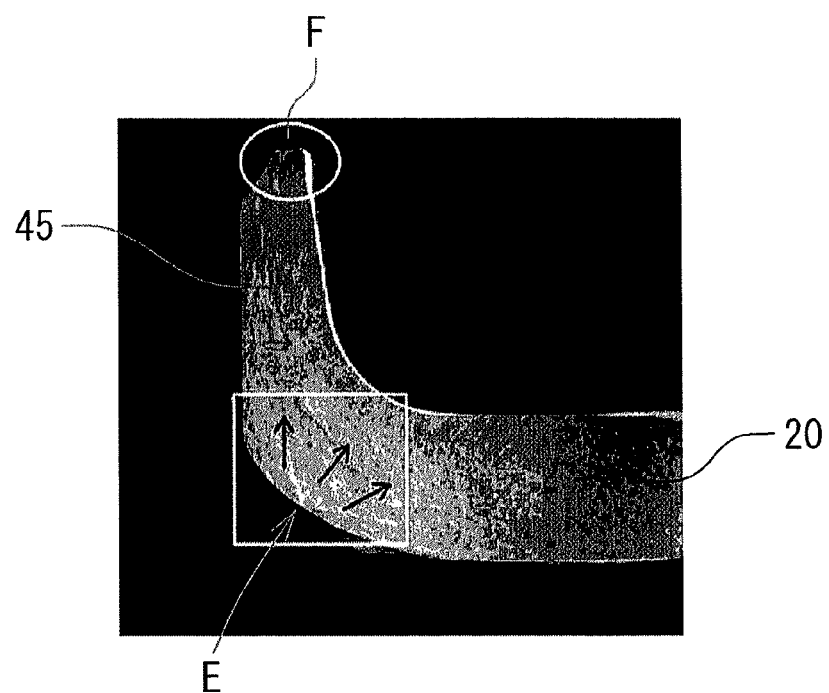
FIG. 27 is a photograph of a vertical cutaway view indicating a start point of a fatigue fracture at the proximal portion of the branch tube of the separator tube.

Two press processing portions 80 are provided at the both sides of the proximal portion of the branch tube 45 in the axial direction of the separator tube 20 (FIGS. 21 and 22 illustrate only one of them). The press processing of the press processing portions 80 corresponds to the residual stress change for pressing the proximal portion of the branch tube 45 from the inside of the separator tube 20 to generate a plastic strain to thereby change the residual stress generated at the proximal portion of the branch tube 45 from the burring processing in a compression direction. Changing the residual stress in the compression direction includes converting a residual tensile stress into a residual compression stress, or eliminating or reducing the residual tensile stress. Further, this includes guiding a residual compression stress in the further compression direction. Referring to FIG. 27, the press processing portion 80 is formed by pressing a vicinity of a portion E, which will become a start point of a fatigue fracture at the proximal portion of the branch tube 45. In FIG. 27, a label F indicates a finally fractured portion by a fatigue fracture.

Further, desirably, the press processing portion 80 is formed as a smooth curved surface without a corner to prevent concentration of a stress.

In this manner, the press processing portions 80 are formed at the proximal portion of the branch tube 45, by which it is possible to reduce or eliminate the residual tensile stress at the proximal portion of the branch tube 45 or convert this residual stress into a residual compression stress, or guide a residual compression stress in the further compression direction to enhance the pressure resistance and the fatigue strength of the separator tube 20 in a similar manner to the above-described embodiment. Then, it is possible to obtain a similar fatigue strength to the above-described embodiment that includes the protrusions 60. As a result, in a similar manner to the above-described embodiment that includes the protrusions 60, it is possible to further reduce the thickness of the separator tube 20, and reduce the manufacturing cost of the shock absorber due to improvement of the productivity according to facilitation of the machining of the separator tube 20, and simplification of the processing facility according to elimination of the necessity of a surface treatment such as nitridation.

Next, a procedure for forming the press processing portions 80 at the proximal portion of the branch tube 45 will be described.

Figure 23:
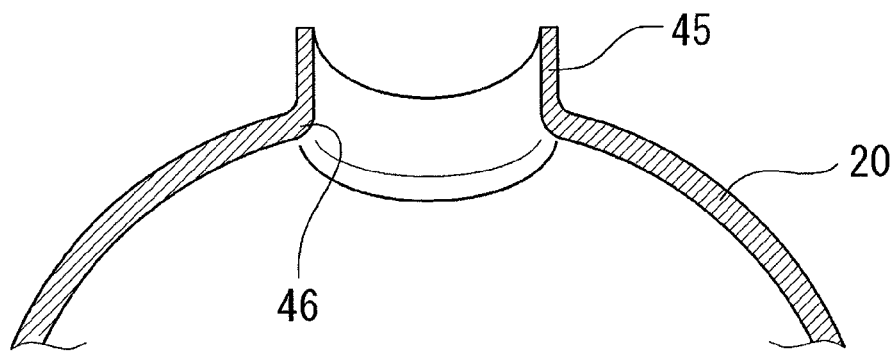
FIG. 23 is a cutaway perspective view of the branch tube portion before the separator tube illustrated in FIG. 21 is processed by press processing as viewed from the inside.
Figure 24:
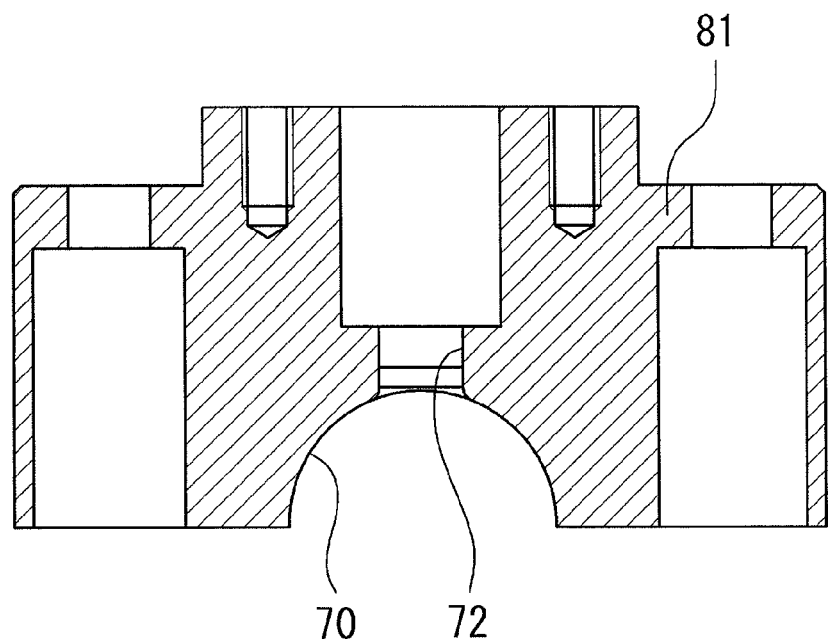
FIG. 24 is a vertical cross-sectional view of a die for performing the press processing on a proximal portion of the branch tube of the separator tube illustrated in FIG. 21.
Figure 25:
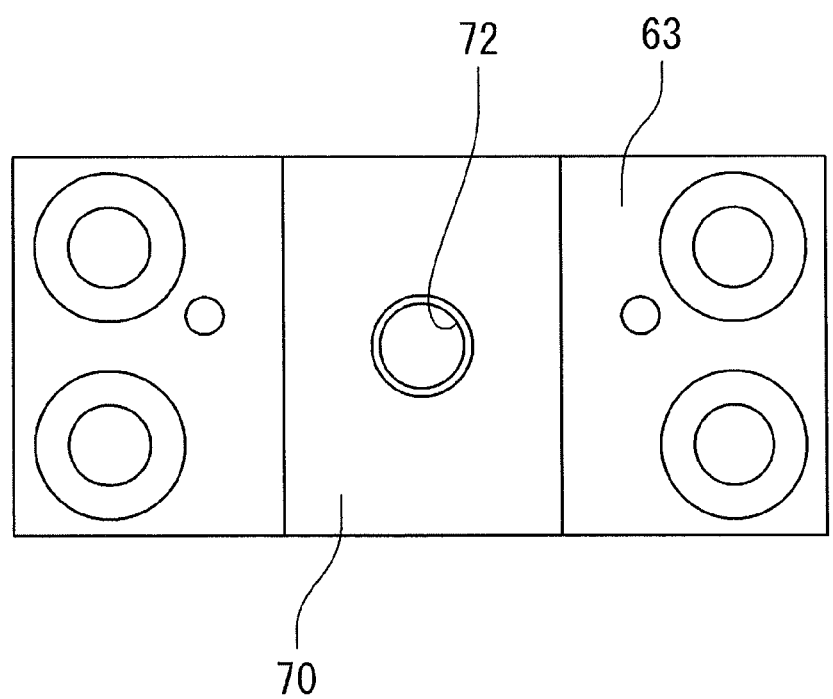
FIG. 25 is a bottom view of the die illustrated in FIG. 24.

First, as illustrated in FIG. 23, only the branch tube 45 is formed at the separator tube 20 without forming the protrusions 60 at the separator tube 20, with use of a burring die 81 illustrated in FIGS. 24 and 25 and a burring punch (not illustrated) corresponding thereto together with the burring die unit 61 illustrated in FIGS. 8 and 9, instead of the burring die 63 and the burring punch 62. As illustrated in FIGS. 24 and 25, the burring die 81 is substantially similarly shaped to the burring die 63 illustrated in FIGS. 13 and 14 except that the burring die 81 does not include the flat portion 71 for forming the protrusions 60 at the concaved portion 70 that will receive the sidewall of the separator tube 20. Further, the burring punch corresponding to the burring die 81 is substantially similarly shaped to the burring punch 62 illustrated in FIGS. 10 to 12 except that the burring punch does not include the emboss formation portion 69 for forming the protrusions 60.

Then, the branch tube 45 is formed without forming the protrusions 60 by performing the burring processing on the sidewall of the separator tube 20 with use of the burring die unit 61, the burring die 81, and the burring punch corresponding thereto.

Figure 26:
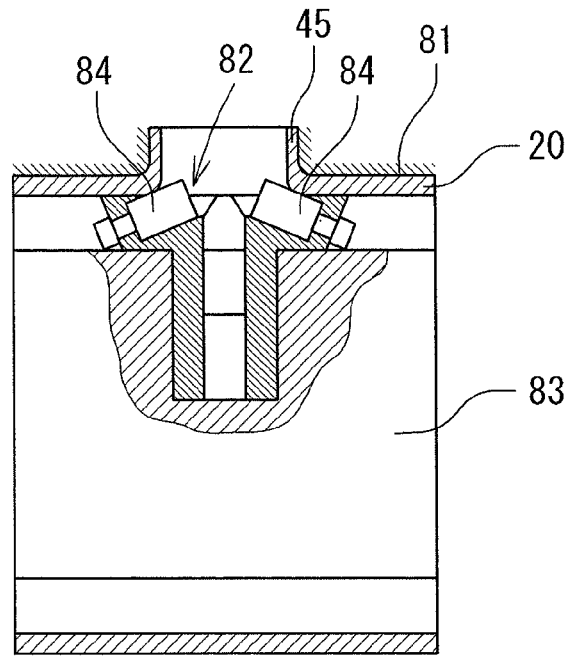
FIG. 26 is a vertical cross-sectional view of the separator tube and a punch, illustrating a procedure for performing the press processing on the proximal portion of the branch tube of the separator tube illustrated in FIG. 21.

After the burring processing, as illustrated in FIG. 26, the sidewall of the separator tube 20 and the outer surface of the branch tube 45 are supported by the burring die 81, and a mandrel 83 with a press punch 82 for forming the press processing portions 80 mounted thereon is inserted in the separator tube 20. A pair of punches 84 is provided at the press punch 82. The pair of punches 84 faces the two positions at the both sides of the proximal portion of the branch tube 45 along the axial direction of the separator tube 20. The pair of punches 84 has a cylindrical surface as the outer circumferential surface thereof, and is disposed obliquely so as to face the portions E (refer to FIG. 27), which will become start points of a fatigue fracture at the proximal portion of the branch tube 45. Then, the mandrel 83 is moved to press the cylindrical surface of the punch 83 against the inner surface of the proximal portion of the branch tube 45 to form the press processing portions 80. In this manner, the press processing portions 80 are formed by pressing the vicinity of the portions E, which will become start points of a fatigue fracture of the proximal portion of the branch tube 45.

In the present embodiment, the press processing portions 80 are formed at two positions at the proximal portion of the branch tube 45. However, the press processing portion(s) 80 may be formed at a single position, three or more positions, or along the whole circumference. In other words, the press processing portions 80 may be provided at any positions capable of converting a residual stress causing a fatigue fracture from a tensile side into a residual stress at a compression side, reducing or eliminating a residual tensile stress, or guiding even a residual compression stress in the further compression direction at a portion where a fatigue fracture may likely occur due to repeated application of a load according to an actual usage.

For example, as illustrated in FIG. 1, if the branch tube 45 is disposed at a position closer to an axial one end of the separator tube 20, a large stress is generated at the proximal portion of the branch tube 45 at the other end side far away from the branch tube 45. Therefore, in this case, the press processing portion 80 may be provided only at this single position. On the other hand, if the branch tube 45 is disposed around an axial center of the separator tube 20, the press processing portions 80 may be formed at the two positions at the both sides of the proximal portion of the branch tube 45 along the axial direction of the separator tube 20, or may be formed along the whole circumference of the proximal portion. Further, in the above-described embodiment illustrated in FIGS. 1 to 20, after the formation of the protrusions 60 at the proximal portion of the branch tube 45 of the separator tube 20, the press processing portion(s) 80 may be further formed to improve the residual tensile stress into the compression direction. Further, in the above-described example, the press processing portions 80 are formed by pressing the inner side of the proximal portion of the branch tube 45. However, the press processing portions 80 may be formed by pressing the outer side of the proximal portion of the branch tube 45 as long as this formation can improve a residual tensile stress generated at the portions E, which will become start points of a fatigue fracture, in the compression direction.

According to the above-described embodiments, it is possible to enhance the pressure resistance and the fatigue strength of the tube provided with the branch tube, and reduce the thickness thereof.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Applications No. 2012-181933 filed on Aug. 20, 2012 and No. 2013-039558 filed on Feb. 28, 2013.

The entire disclosure of Japanese Patent Applications No. 2012-181933 filed on Aug. 20, 2012 and No. 2013-039558 filed on Feb. 28, 2013 including specification, claims, drawings and summary are incorporated herein by reference in its entirety.

What is claimed is:
1. A method for making a shock absorber, the shock absorber comprising:
 a cylinder sealingly containing hydraulic fluid;
 a piston inserted in the cylinder;
 a piston rod coupled with the piston and extending to an exterior of the cylinder;
 an outer tube externally disposed around the cylinder;

a separator tube externally disposed around the cylinder and including a cylindrical sidewall that defines an annular passage in communication with an interior of the cylinder;

a reservoir formed between the cylinder and the outer tube outside the separator tube, the reservoir sealingly containing the hydraulic fluid and gas; and a substantially cylindrical branch tube integrally formed on the cylindrical sidewall of the separator tube, and protruding radially outwardly while defining a passage in communication with the annular passage, wherein the shock absorber is configured to be mounted between relatively movable two members, the method comprising:

forming a prepared hole on the cylindrical sidewall of the separator tube;

causing a portion of the cylindrical sidewall of the separator tube that surrounds the prepared hole to protrude radially outwardly to form the substantially cylindrical branch tube by burring processing; and pressing a first side and a second side of a proximal portion of the substantially cylindrical branch tube in a circumferential direction or an axial direction of the cylindrical sidewall of the separator tube from an interior to concave an inner circumferential surface radially outwardly to form at least a portion of a first recess spaced apart from the substantially cylindrical branch tube and at least a portion of a second recess spaced apart from the substantially cylindrical branch tube.

2. The method for making the shock absorber according to claim 1, wherein
by the pressing, a compression stress by a plastic flow is generated at the first side and the second side of the proximal portion of the substantially cylindrical branch tube,
by the burring processing, a residual stress generated at the proximal portion of the substantially cylindrical branch tube is changed in a compression direction.

3. The method for making the shock absorber according to claim 1, wherein
in the pressing step, protrusions, which protrude radially outwardly, are formed on outer circumferential surfaces of the first side and the second side of the proximal portion of the substantially cylindrical branch tube which correspond to the first recess and the second recess.

4. The method for making the shock absorber according to claim 1, wherein
each of the first recess and the second recess has a substantially semicircular shape which surrounds the proximal portion of the substantially cylindrical branch tube.

5. The method for making a shock absorber according to claim 1, wherein
a burring punch used in the pressing step includes a substantially cylindrical branch tube formation portion having a distal end which is rounded, and an emboss formation portion that is integrally formed at a proximal end of the substantially cylindrical branch tube formation portion and extends in a diametrical direction, and
during the burring processing, the pressing is performed, in which the emboss formation portion of the burring punch abuts against the inner circumferential surface to form the first recess and the second recess.

6. The method for making the shock absorber according to claim 1, wherein the pressing step is performed after the burring processing.

7. A shock absorber comprising:
a cylinder sealingly containing hydraulic fluid;
a piston inserted in the cylinder;
a piston rod coupled with the piston and extending to an exterior of the cylinder;
an outer tube externally disposed around the cylinder;
a separator tube externally disposed around the cylinder and having a cylindrical sidewall that defines an annular passage in communication with an interior of the cylinder;
a reservoir formed between the cylinder and the outer tube outside the separator tube, the reservoir sealingly containing the hydraulic fluid and gas; and
a substantially cylindrical branch tube integrally formed on the cylindrical sidewall of the separator tube, and protruding radially outwardly while defining a passage in communication with the annular passage,
wherein the shock absorber is configured to be mounted between relatively movable two members, and
wherein the substantially cylindrical branch tube is formed by causing the cylindrical sidewall of the separator tube to protrude radially outwardly, recesses are formed at both sides of a proximal portion of the substantially cylindrical branch tube in a circumferential direction of the cylindrical sidewall of the separator tube by pressing the cylindrical sidewall of the separator tube from an interior thereof to concave an inner circumferential surface radially outwardly, and at least a portion of the recesses are spaced apart from the substantially cylindrical branch tube.

8. The shock absorber according to claim 7, wherein
the separator tube has protrusions protruding radially outwardly which are formed on outer circumferential surfaces of both sides of the proximal portion of the substantially cylindrical branch tube which correspond to the recesses.

9. The shock absorber according to claim 8, wherein
each of the recesses has a substantially semicircular shape which surrounds the proximal portion of the substantially cylindrical branch tube.

10. A method for making a shock absorber, the shock absorber comprising:
a cylinder sealingly containing hydraulic fluid;
a piston inserted in the cylinder;
a piston rod coupled with the piston and extending to an exterior of the cylinder;
an outer tube externally disposed around the cylinder;
a separator tube externally disposed around the cylinder and including a cylindrical sidewall that defines an annular passage in communication with an interior of the cylinder;
a reservoir formed between the cylinder and the outer tube outside the separator tube, the reservoir sealingly containing the hydraulic fluid and gas; and
a substantially cylindrical branch tube integrally formed on the cylindrical sidewall of the separator tube, and protruding radially outwardly while defining a passage in communication with the annular passage,
wherein the shock absorber is configured to be mounted between relatively movable two members,
the method comprising:
forming a prepared hole on the cylindrical sidewall of the separator tube;
causing a portion of the cylindrical sidewall of the separator tube that surrounds the prepared hole to protrude radially outwardly to form the substantially cylindrical branch tube by burring processing; and pressing a vicinity of a proximal portion of the substantially cylindrical branch tube from an inner circumferential surface or an outer circumferential surface to change a residual stress generated at the proximal portion of the substantially cylindrical branch tube by the burring processing in a compression direction to generate a plastic strain to form a press processing portion spaced apart from the substantially cylindrical branch tube.

11. The method for making the shock absorber according to claim 10, wherein the pressing step includes pressing at least one side of the proximal portion of the substantially cylindrical branch tube along an axial direction of the separator tube.

12. The method for making the shock absorber according to claim 10, wherein the pressing step includes pressing both sides of the proximal portion of the substantially cylindrical branch tube in a circumferential direction of the cylindrical sidewall of the separator tube.

13. The method for making the shock absorber according to claim 12, wherein
in the pressing step, recesses are formed at both sides of the proximal portion of the substantially cylindrical branch tube by concaving the inner circumferential surface radially outwardly.

14. The method for making the shock absorber according to claim 13, wherein
each of the recesses has a substantially semicircular shape which surrounds the proximal portion of the substantially cylindrical branch tube.

15. The method for making the shock absorber according to claim 10, wherein the pressing step is performed during the burring processing.

16. The method for making the shock absorber according to claim 10, wherein the pressing step includes pressing the proximal portion of the substantially cylindrical branch tube from an interior thereof.

17. The method for making the shock absorber according to claim 16, wherein
in the pressing step, recesses are formed at both sides of the proximal portion of the substantially cylindrical branch tube in a circumferential direction of the cylindrical sidewall of the separator tube by concaving the inner circumferential surface radially outwardly.

18. The method for making the shock absorber according to claim 17, wherein
in the pressing step, protrusions, which protrude radially outwardly, are formed on outer circumferential surfaces of both sides of the proximal portion of the substantially cylindrical branch tube which correspond to the recesses.

19. The method for making the shock absorber according to claim 10, wherein
a burring punch used in the pressing step includes a substantially cylindrical branch tube formation portion having a distal end which is rounded, and an emboss formation portion that is integrally formed at a proximal end of the substantially cylindrical branch tube formation portion and extends in a diametrical direction, and
during the burring processing, the residual stress is changed, in which the emboss formation portion of the burring punch abuts against the inner circumferential surface to press the inner circumferential surface.

20. The method for making the shock absorber according to claim 10, wherein the pressing step is performed after the burring processing.

* * * * *